United States Patent [19]

Leeson

[11] 3,832,846
[45] Sept. 3, 1974

[54] SPEED GOVERNOR WITH FUEL RATE CONTROL
[75] Inventor: James L. Leeson, Rockford, Ill.
[73] Assignee: Woodward Governor Company, Rockford, Ill.
[22] Filed: Apr. 27, 1972
[21] Appl. No.: 248,058

[52] U.S. Cl. .................. 60/39.28 R, 60/39.28 P
[51] Int. Cl. .............................................. F02c 9/06
[58] Field of Search .................................. 60/39.28

[56] References Cited
UNITED STATES PATENTS

| | | | |
|---|---|---|---|
| 3,076,312 | 2/1963 | Haigh | 60/39.28 R |
| 3,128,603 | 4/1964 | Haigh | 60/39.28 R |
| 3,357,177 | 12/1967 | Cornett | 60/39.28 R |
| 3,421,317 | 1/1969 | Bedford | 60/39.28 R |
| 3,478,512 | 11/1969 | Brahm | 60/39.28 R |
| 3,488,948 | 1/1970 | Cornett | 60/39.28 R |
| 3,596,467 | 8/1971 | Avery | 60/39.28 R |
| 3,712,055 | 1/1973 | McCabe | 60/39.28 R |

Primary Examiner—Clarence R. Gordon
Attorney, Agent, or Firm—Wolfe, Hubbard, Leydig, Voit & Osann, Ltd.

[57] ABSTRACT

A fuel flow scheduling system for a prime mover in which the maximum and minimum allowable rates of fuel flow are computed as functions of various operating variables of the prime mover and compared to a control signal emanating from an integrating amplifier of a speed governor, the latter signal being a measure of the flow rate called for in maintaining the prime mover at a desired set point speed. If the flow rate desired by the governor exceeds the computed limits, the input of the integrating amplifier is modified so as to prevent further integral build up of its output signal and to facilitate smooth transition from operation at the computed limits of commanded fuel rate to operation at a normal fuel rate. Various alternative minimum and maximum fuel rate functions are computed from parameters measured by sensors associated with the prime mover. Limiting in the manner described is made possible by the incorporation of a precision voltage-to-flow rate transducer in the form of a constant displacement pump driven by a variable-speed voltage-controlled servomotor.

7 Claims, 3 Drawing Figures

SPEED GOVERNOR WITH FUEL RATE CONTROL

DESCRIPTION OF THE INVENTION

This invention relates generally to fuel flow control apparatus for prime movers and more particularly concerns the speed governing by electronic means of reaction type turbine engines.

The control of fuel flow to the burners of a gas turbine or jet engine has heretofore required expensive and elaborate regulating equipment for achieving maximum economy and efficiency over all speeds and operating temperatures normally encountered in the use of such engines. These engines are often used for high performance applications in which the internal components are subjected to unusually severe stress in the form of temperature, speed and vibration. The control of fuel rate, in particular, is highly important, since an excessive rate of fuel flow into the burner for a given speed creates operating temperatures which would do irreparable harm to the blades in the turbine. A fuel rate which is too low for a given speed might result in extinguishment of the sustaining flame in the burner or in an excessive amount of pressure build-up within the burner compartment.

Therefore, the fuel rate, whether commanded manually by a pilot or automatically by a speed governor associated with the engine, has been monitored and prevented from exceeding predefined limits. Conventional limiting apparatus has been of the mechanical, pneumatic or hydraulic type and has involved limiting the output pressure of the fuel source, the position of a valve in the fuel line or the pressure developed across a fuel pump. In other words, the known techniques have all involved limiting the fuel rate downstream in the speed control signal chain near the engine itself rather than back upstream in the signal chain where the actual command for an excessive fuel rate originated.

A primary objective of the invention is to provide a speed governor of the integrating type which can be fuel-rate limited while nevertheless eliminating appreciable periods of transient speed error following limiting action.

An important objective of the present invention is to provide a speed governing servo control which operates predominantly to correctively change the rate of energy input to a prime mover according to the integral of the speed error, but in which excessive integration build-up, due to the continuance of speed errors when the flow rate is being limited, is avoided—and thus periods of underspeed or overspeed, after respective periods of overspeed or underspeed are minimized.

A coordinate object is to effect limiting of the rate of energy input to a prime mover by providing and applying modifying inputs to an integrating device which is included in a speed governing servo loop, thereby to minimize transient errors when the limiting conditions terminate.

It is another object of the present invention to provide a fuel rate control system employing an electric speed governor which is prevented from building up excessively large fuel rate command signals at any point within the speed governing loop.

It is still another object of the present invention to provide a fuel rate control system employing a precision voltage-to-flow rate transducer so that an electrical representation of the actual fuel flow rate is provided for comparison to signals corresponding to the permissable maximum or minimum fuel flow rates.

It is a further object of the invention to provide a fuel control system in which an electronic governor is employed for normally controlling the prime mover at a desired set point speed and in which several operating variables of the prime mover are used to define predetermined limits for the build-up of signals within the electronic governor.

It is a further object of the present invention to provide a fuel governing system for jet engines in which the speed and compressor discharge pressure are continuously monitored and combined to define a limit for the rate of fuel intake into the engine, and wherein the limit values are compared with the actual values of fuel rate to provide an artificial or apparent reduction in the speed error signal when limiting of fuel rate must take place.

Still another object is the provision of fuel rate limiting means for use with an electronic governor which is more reliable and accurate than the prior controls in that the limiting means is integrally associated with the signal-carrying circuits in the main governor control loop.

Other objects and advantages of the invention will become apparent from the following detailed description taken in connection with the accompanying drawings, in which.

While the invention will be described in connection with certain preferred embodiments it will be understood that I do not intend to limit the invention to those embodiments. On the contrary, I intend to cover all alternatives, modifications and equivalents as may be included within the spirit and scope of the invention.

Figure 1:
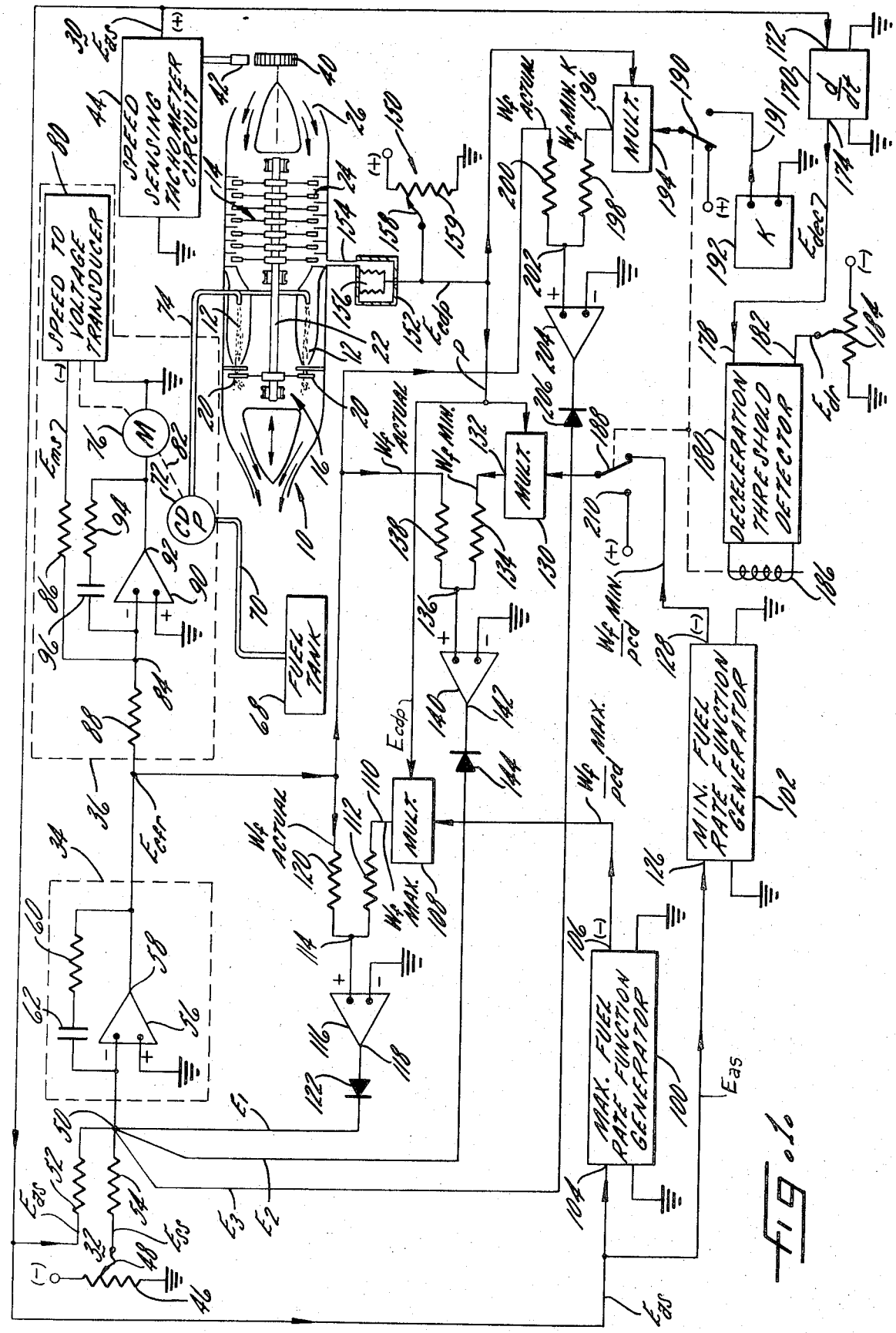
FIG. 1 is an electrical diagram, partially in block form, of a fuel flow control system embodying the present invention.

Turning now to FIG. 1, a reaction engine 10 of the jet turbine type is shown in simplified form as having a burner 12, a compressor 14 discharging air into the burner and a turbine 16 driven by the hot gases developed by the burner 12. Turbine blades 20 are provided for transferring rotary motion to the compressor 14 via a connecting shaft 22. The shaft 22 drives a plurality of blades 24 designed so that the pressure of the air delivered to the burners 12 is greatly increased over the pressure of the air brought in through the inlet port 26 at the forward end of the engine.

For controlling the speed of the turbine engine 10 there is provided an electronic speed governor which includes a speed sensing circuit 30 providing a signal $E_{as}$ corresponding to the actual speed of the prime mover, a reference generator 32 providing a signal $E_{ss}$ corresponding to a desired set point speed for the prime mover, a governor amplifier 34 and a voltage-to-flow rate transducer 36. The speed sensing circuit 30 may be of any type developing an electrical signal corresponding to the actual rotational speed of the turbine. In the embodiment shown, the circuit 30 includes a toothed wheel 40 mechanically driven by the shaft 22 and a magnetic pickup 42 located adjacent the periphery of the wheel 40 so that an output pulse is developed as each tooth of the wheel 40 passes the pickup and changes its flux pattern. The output pulses, having a frequency proportional to speed, are fed to a tachometer circuit 44 which converts them into a d-c. voltage signal $E_{as}$ which varies in magnitude so as to be proportional to the speed of the engine 10.

The reference generator 32 includes a potentiometer 46 connected between a negative supply voltage and ground and having an adjustable wiper 48 on which there is developed the signal $E_{ss}$ the voltage level of which represents the desired set point speed for the engine 10. The wiper 48 may be positioned, for example, by adjustment of the pilot's speed control lever in the cockpit of a jet aircraft. The signals $E_{as}$ and $E_{ss}$ representing the actual and set point speeds respectively are fed to a summing junction 50 through resistors 52 and 54 respectively.

In accordance with one aspect of the present invention the speed error, represented by the difference between the signals $E_{ss}$ and $E_{as}$, is integrated to derive a control signal which correctively changes the rate of energy input to the prime mover in a sense to reduce that error to zero. As here shown, the signals $E_{as}$ and $E_{ss}$ are effectively compared at the summing junction 50 to produce a resultant speed error signal which is fed to an integrating amplifier 34. While the amplifier 34 will typically be a rather complex electronic circuit, it can be and is here represented schematically as including an operational amplifier 56 having its non-inverting input grounded and its inverting input connected to receive the resultant signal from the summing point 50. The amplifier 56 provides an output signal at a terminal 58 which is fed back to its non-inverting input through a series R-C circuit consisting of a resistor 60 and a capacitor 62. It will be appreciated by one skilled in the art that the configuration shown for the amplifier 34 provides an output signal which may be visualized as the sum of two terms, i.e., a term proportional to the input signal and a term proportional to the time integral of the input signal. As such, the magnitude of the output signal from the amplifier 34 varies in accordance with both the magnitude and duration of the input signal from the summing junction 50, the input signal representing the difference between the actual and set point speeds of the engine 10. The integral term developed in the amplifier 34 makes the speed governor isochronous in nature, as will be hereinafter described.

In conventional speed governing apparatus a fuel pump with a pressure relief bypass is provided for developing a source of fuel at a constant pressure, and the flow of fuel to the prime mover is controlled by a throttle valve driven by a proportional or integrating amplifier. In keeping with the objectives of the present invention, however, fuel rate to the engine is controlled by the transducer 36, which precisely controls flow rate to the engine in proportion to the magnitude of an input signal $E_{cfr}$ which represents the commanded flow rate computed by the governor. Fuel is drawn from a tank 68 through a conduit 70 by a constant displacement pump 72 which delivers the fuel to the burners 12 through a conduit 74. A variable speed motor 76 is provided for mechanically driving the pump 72 and a speed-to-voltage transducer 80 via a mechanical connection 82. The transducer 80, which may be a d-c. tachometer or the like, produces an output signal $E_{ms}$ which increases in negative magnitude as the speed of the motor 76 increases. The motor speed signal Ems is connected to a summing junction 84 through a resistor 86, while the computed flow rate signal $E_{cfr}$ is connected to the summing junction 84 through a resistor 88. The summing junction 84 is connected to the inverting input of an operational amplifier 90, while the non-inverting input to the amplifier 90 is referenced to ground potential. The amplifier 90 provides an output voltage at a terminal 92 which is fed back to its non-inverting input through a series R-C circuit including a resistor 94 and a capacitor 96. With the feedback shown, the amplifier 90 provides an output signal which is proportional to the sum of two terms respectively proportional to the input signal at the summing junction 84 and the time integral of that input signal. The output of the amplifier 90 is additionally applied across the field winding of the motor 76 and provides the excitation thereto, the motor 76 being designed so as to increase in speed in proportion to the increase in the negative magntiude of the output signal from the amplifier 90.

The transducer 36 operates in th following manner. As the signal $E_{cfr}$ at the input to the transducer 36 increases, the output of the amplifier 90 at terminal 92 increases negatively to increase the speed of the motor 76, which, in turn, results in an increase in the flow rate through the pump 72. However, the speed-to-voltage transducer 80 produces a signal which increases negatively to provide degenerative feedback through the resistor 86 to the summing junction 84. As a result, the motor 76 attains a speed which is proportional to the magnitude of the voltage input signal $E_{cfr}$. The flow rate through the pump 72 is proportional to the speed of the motor 76 and, therefore, to the magnitude of the signal $E_{cfr}$. Any long term variations in the characteristics of the control loop for the motor 76, such as might result from increased temperature or wear of the motor bearings etc., are balanced out by the integral term developed by the amplifier 90 as a result of its R-C degenerative feedback.

To this point there has been described a complete speed governing system. In operation, a reference speed for the motor 10 is chosen by manually adjusting the wiper 48 of the reference generator 32 to produce a desired signal $E_{ss}$ of negative polarity. This signal is fed through the resistor 54 to the summing junction 50 at the inverting input of the amplifier 56, resulting in a positive-sense signal $E_{cfr}$ representing the commanded flow rate. The positive signal $E_{cfr}$ produces a corresponding rate of fuel flow through the constant displacement pump 72 to the burners 12 of the engine 10. The control loop is closed by the speed sensing circuit 30 which detects the rotational speed of the shaft 22 of the engine 10 and develops a feedback signal $E_{as}$ of a positive polarity which is fed to the summing junction 50 to counterbalance the negative polarity set point signal $E_{ss}$.

The governor control loop can be dynamically excited either by manually changing the setting of the reference generator 32 or by subjecting the engine 10 to a load change. For example, assume that the set point speed is suddenly increased by moving the wiper 48 of the reference generator 32 toward the negative terminal of the potentiometer 46. The voltage at the summing junction 50 decreases to effect an increase in the voltage of the signal $E_{cfr}$ at the output terminal 58 of the amplifier 56. As the signal $E_{cfr}$ increases positively at the input to the transducer 36, the output of the operational amplifier 90 increases negatively to increase the speed of the motor 76 and the flow rate of fuel through the pump 72 to the engine 10. As the engine speed increases, as detected by the sensing circuit 30, the positive signal $E_{as}$ increases to offset the increased negative signal $E_{ss}$ at the summing junction 50. Eventually the engine speed reaches equilibrium, at which time the signals $E_{as}$ and $E_{ss}$ are equal in magnitude and opposite in polarity so that no signal is presented to the input of the amplifier 34. Because of the integrating characteristic of the amplifier 34, however, the commanded flow rate signal $E_{cfr}$ assumes a positive polarity steady-state value to keep the motor 76 running so as to maintain fuel flow to the engine 10 through the pump 72. In this way, the governor disclosed is isochronous in operation, and no steady-state speed error, commonly called speed "droop" need be maintained.

Through the use of an extremely high gain operational amplifier 90, the speed of the motor 76, and thus the flow rate, can be made to closely track the magnitude of the signal $E_{cfr}$ both dynamically and statically. As such, it is seen that provision of the transducer 36 results in an accurate electrical measurement of fuel flow rate being provided, in that the actual flow rate is directly proportional to the electrical signal $E_{cfr}$. Since the amplifier 34 of the governor is also typically characterized by an extremely high gain, the computed flow rate signal $E_{cfr}$ may, under extreme circumstances, rise to a greater magnitude than that which the engine 10 can safely tolerate under the prevailing operating conditions, without damage. Also, due to the integrating characteristics of the amplifier 34, even slowly applied load changes to the engine 10 can result in undesirable voltage levels for the signal $E_{cfr}$ if the engine speed deviates from the set point for a prolonged period of time.

Therefore, in accordance with the present invention, there is provided means for monitoring certain operating variables of the engine 10 for defining the limits for the rate of fuel flow as a function of those operating variables. More specifically, the measured operating variables of the engine 10 are used to compute and develop electrical signals against which the flow rate command signal $E_{cfr}$ is continuously compared. If the magnitude of the signal $E_{cfr}$ approaches the limits defined by the computed signals against which it is compared, the input to the governor amplifier 34 falls under the supervisory control of limiting apparatus, hereinafter described, until the commanded fuel rate signal $E_{cfr}$ again falls within the defined limits.

Figure 2:
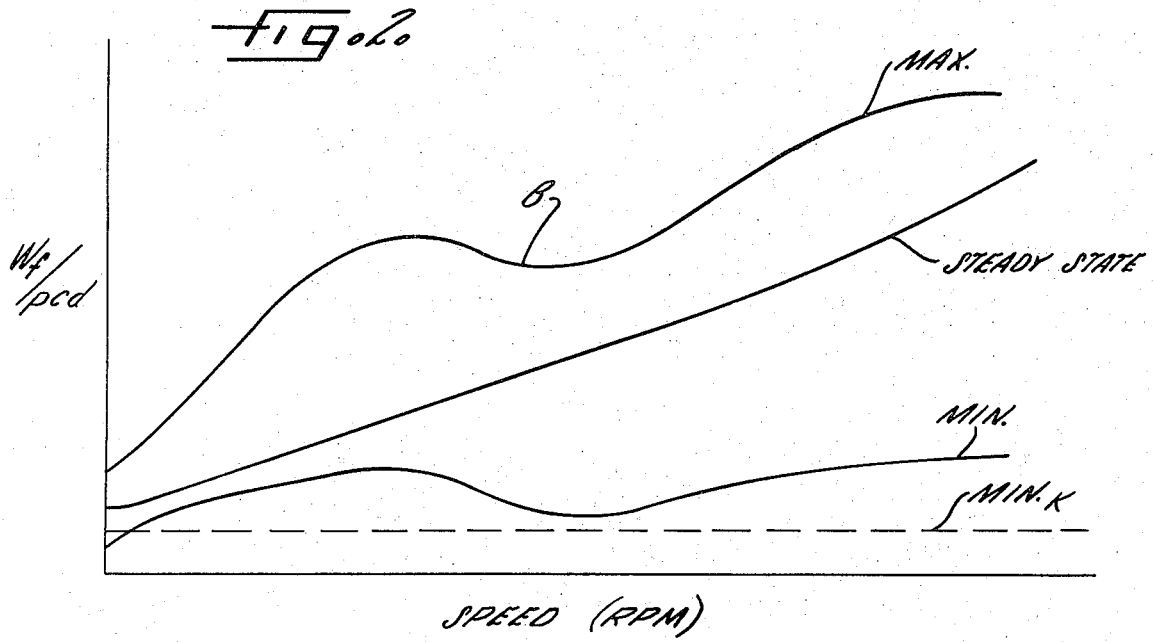
FIG. 2 is a graph illustrating the operation of the apparatus shown in FIG. 1.

To this end, there are provided maximum and minimum fuel rate function generators 100, 102 respectively. The operation of these generators as a limiting means will be understood more clearly from the description to follow and by reference to the operational characteristics of the system illustrated by the graph of FIG. 2. The graph shows solid line functions corresponding to the computed maximum (MAX.) and minimum (MIN.) values for the ratio $W_f/P_{cd}$, where $W_f$ is the weight of fuel to the engine per unit time and $P_{cd}$ is compressor discharge pressure. The abscissa for the graph is engine speed (RPM), so that the curves shown define the limits at any given speed for the ratio $W_f/P_{cd}$. Between the computed maximum and minimum limits there is shown a curve representing the typical steady state characteristics of a speed governed jet engine. While the details of synthesizing the actual maximum and minimum fuel rate functions do not form a part of this invention, it should be noted that these functions will differ for different types of engines and that the limit functions shown in the graph are representative of the desired limits for turbine engines. The permissable maximum for the ratio $W_f/P_{cd}$ generally rises with increasing speed, as indicated at A of FIG. 2, although a dip in the curve arises, as indicated at B, for a speed range in which the compressor is particularly susceptible to stall. In general, however, the fuel rate maximum is chosen so as to prevent excessive heat build-up in the burner 12 of the engine 10, which would damage the blades of the turbine.

Similarly, there is a minimum permissable fuel flow rate necessary to keep the engine running without flame-out for any given set of engine operating conditions. For convenience, the lower limit, or minimum function, for the ratio $W_f/P_{cd}$ is typically made a fraction of the maximum rate function so that function generators of similar construction may be used with a mere variation in gains. Both maximum and minimum fuel rate functions shown by the solid lines of FIG. 2 have speed and compressor discharge pressure $P_{cd}$ as independent variables. Alternatively, the fuel rates to certain gas turbines may be limited only as a function of compressor discharge pressure $P_{cd}$, so that the maximum allowable deceleration will be available throughout the speed range. The corresponding curve for the ratio $W_f/P_{cd}$ is represented by the dotted line $MIN_K$ of FIG. 2 and is constant throughout the entire speed range.

Returning then to FIG. 1, for the purpose of generating the signal corresponding to the desired maximum for the ratio $W_f/P_{cd}$, function generator 100 is provided with an input 104 for receiving the signal $E_{as}$ representing the actual speed of the prime mover as measured by the speed sensing circuit 30. An output terminal 106 from the generator 100 provides a negative-sense signal which is a predetermined function of speed only. The output signal at terminal 106 is applied to a multiplier 108, where it is multiplied by a signal $E_{cdp}$. An output terminal 110 from the multiplier 108 therefore provides a signal representing the permissable maximum rate of fuel flow $W_f$ for the actual values of engine speed and compressor discharge pressure then existing. This signal is fed through a resistor 112 to a summing junction 114 at the non-inverting input to an operational amplifier 116, while the inverting input terminal of the amplifier 116 is referenced to ground potential. Via a resistor 120, the summing junction 114 also receives the commanded flow rate signal $E_{cfr}$ (which, as noted above, is for all intents and purposes proportional to actual rate of flow of fuel to the engine) from the output of the governor amplifier 34. As a result, the actual flow rate to the engine 10, reflected in the magnitude of the signal $E_{cfr}$, is compared to the maximum permissible flow rate represented by the signal at the output 110 from the multiplier 108. The amplifier 116 is further provided with an output terminal 118 which is connected to the anode of a diode 122, the cathode of which is coupled to the governor input summing junction 50. Since the operational amplifier 116 is used in an open-loop, infinite-gain configuration, a voltage at its output 118 tends to be at either the positive or negative supply voltage level depending upon whether the commanded flow rate is above or below the permissible maximum fuel flow rate respectively. The diode 122 is provided to insure that the limiting means 100–122 is effective only in limiting the maximum value of the signal $E_{cfr}$, since, when the output terminal 118 of the amplifier 116 is negative with respect to the voltage at the summing junction 50, only a negligible amount of current flows through the diode 122. In other words, the output of the comparator at the cathode side of the diode 122, is a constant signal of predetermined, large magnitude which exists only when the command signal $E_{cfr}$ is beyond the fuel rate limit represented by the signal $Wf_{max}$.

In similar fashion, the minimum fuel rate function generator 102 is provided with an input terminal 126 for receiving the actual speed signal $E_{as}$ from the speed sensing circuit 30. An output terminal 128 provides a negative-sense voltage which varies in accordance with the permissible minimum ratio $W_f/P_{cd}$ defined by the generator 102. The ratio signal at the output terminal 128 is normally fed to a multiplier 130 which also receives a signal $E_{cdp}$ representing the prevailing compressor discharge pressure $P_{cd}$ monitored at the engine 10. As a result, an output signal is provided by the multiplier at an output terminal 132 which represents the permissible minimum value for the flow rate $W_f$ for the actual engine speed and compressor discharge pressure values then existing. This signal is fed through a resistor 134 to a summing junction 136 where it is compared to an actual flow rate signal $E_{cfr}$ which is fed to the junction 136 through a resistor 138. The resulting signal at the summing junction 136 is connected to the non-inverting input terminal of an operational amplifier 140, the inverting input terminal of which is referenced to ground potential. An output terminal 142 of the operational amplifier 140 is connected to the cathode of a diode 144, the anode of which is connected to the governor input summing junction 50.

Due to the high open loop gain of the operational amplifier 140, the voltage at the output terminal 142 tends to be either at the positive or negative supply voltage, depending upon whether the actual fuel flow rate, represented by the magnitude of the signal $E_{cfr}$, is respectively above or below the permissable minimum fuel rate represented by the voltage at the output terminal 132 of the multiplier 130. If the actual fuel rate $W_f$ is higher than the permissable minimum fuel rate at a given speed and $P_{cd}$, the voltage at the output terminal 142 of the amplifier 138 is at the positive supply level, in which case the current through the diode 144 is negligible, and no supervisory effect on the summing junction 50 occurs. On the other hand, if the actual rate, represented by the magnitude of the signal $E_{cfr}$, falls below the permissable minimum fuel rate represented by the magnitude of the signal at the output 132 of the multiplier 130, the output voltage at the terminal 142 of the operational amplifier 138 goes to the negative supply level, in which case the diode 144 conducts heavily so as to prevent the further decrease of the signal $E_{cfr}$ by clamping the input summing junction 50 to the negative supply voltage.

The ability of the limiting apparatus of the present invention to prevent integral build-up in the speed governor during clamping of the flow rate is appreciated more fully when one considers the possible alternatives to limiting in the manner defined by the present invention. For example, consider the alternate approach of limiting the flow rate downstream at the pump 72. If the supposed limiting apparatus were to hold the rate of flow through the pump 72 at a maximum value, the signal $E_{cfr}$ generated by the governor amplifier 34 could rise to a level far above that corresponding to the actual limited flow rate through the pump 72 due to the build-up of the integral component of the signal $E_{cfr}$ in the amplifier 34. As the speed of the engine 10 increases, the actual speed signal $E_{as}$ eventually balances against the set point speed signal $E_{ss}$ to return the voltage at the summing junction 50 to 0. However, because of the build-up of the integral component of the signal $E_{cfr}$ during the off-speed condition, flow rate at the maximum limit continues through the pump 72 until an over-speed condition results in the engine 10 for a period sufficient to decrease the positive-voltage integral component of the signal $E_{cfr}$ from the amplifier 34. Eventually the speed of the engine 10 settles at the set point speed, but only after the undesirable period of over-speed resulting from the integral build-up in the amplifier 34 during limiting. In control theory terms, an overshoot has resulted in the response of the speed correcting apparatus.

Consider the second alternative in which limiting is performed by clamping the output of the amplifier 34. If an under-speed condition resulted in an overly large speed error $E_{ss}-E_{as}$ such that the corresponding magnitude of the signal $E_{cfr}$ would be above the permissible maximum, the output of the amplifier 34 would be clamped to the programmed maximum level. However, the signal $E_{as}$ might continue to decrease, in which case the voltage at the summing junction 50 would fall to a negative level, charging the capacitor 62 in the feedback circuit of the amplifier 56. Although the speed of the engine 10 might eventually rise to the set point speed, in which case the voltage difference $E_{ss}-E_{as}$ would return to zero, the commanded flow rate signal $E_{cfr}$ would for a period of time, remain at the limited maximum level as a result of the charge accumulated on the capacitor 62. A period of over-speed of the prime mover 10 would result while the charge on the capacitor 62 dissipates. Although the engine speed might eventually settle at the set point speed, the period of over-speed as a result of the build-up of charge on the capacitor 62 is highly undesirable.

Contrast these two alternative approaches to the limiting technique used in the present invention, in which the clamping is performed at the input to the integrating amplifier 34. Again taking the maximum flow rate limiting function as an example, consider the situation in which, as a result of an abrupt change in the load on the engine 10, the actual speed signal $E_{as}$ rapidly decreases and creates a speed error $E_{ss}-E_{as}$ which makes the commanded flow rate signal $E_{cfr}$ at the output of the amplifier 34 tend to rise to a magnitude calling for an actual flow rate $W_f$ beyond the permissible limit defined by the function generator 100 and the multiplier 108. As the magnitude of the signal $E_{cfr}$ reaches the defined maximum value for the prevailing speed and compressor discharge pressure $P_{cd}$, the voltage at the summing junction 114 at the input to the amplifier 116 goes positive with respect to ground, causing the output 118 of the amplifier 116 to rise toward the positive supply voltage. Clamped to the amplifier output 118 through the diode 122, the voltage at the summing junction 50 tends to rise rather than to fall (as it had been doing prior to limiting), and the commanded flow rate signal $E_{cfr}$ begins to decrease to a value below its permissible maximum as defined by the output 110 of the multiplier 108. As a result, the signal at the summing junction 114 goes negative with respect to ground, and the output 118 of the amplifier 116 momentarily returns to a negative voltage. If the speed error still dictates a value for the signal $E_{cfr}$ beyond the permissible maximum, the clamping by the limiting amplifier 116 again becomes effective to clamp the voltage at the input summing junction 50. The intermittent actuation of the clamping amplifier 116 continues so long as the speed error $E_{ss}-E_{as}$ would, under normal governor operation, dictate a flow rate $W_f$ beyond the permissible maximum. As such, the limiting apparatus can be seen to exert a supervisory effect on the input summing junction 50 during limiting operations. The above analysis of limiting the maximum flow rate applies equally well to limiting of the minimum flow rate by the apparatus of the present invention.

Although a certain amount of oscillation or switching action may result in some instances at the input of the amplifier 34 during the limiting operation, build-up of an integral signal within the amplifier 34 is prevented and the magnitude of the commanded fuel rate signal $E_{cfr}$ does not fluctuate significantly from the permissible limit defined by the limiting apparatus. From the foregoing it is seen that the limiting apparatus of the present invention only affects the normal operation of the governor signal train during substantial off-speed periods, and no residual effects, such as that due to integral build-up in the possible alternative systems defined above, are experienced in the normal governor operation as the speed error diminishes to a level below which the magnitude of the signal $E_{cfr}$ is within the permissible limits. The transition from operation under the supervisory control of the limiting apparatus to normal operation of the speed governor is smooth, and normal speed governing resumes without the undesirable "overshoot" defined above.

The speed signal $E_{as}$ used in the function generators 100 and 102 may be provided by the same speed sensing circuit 30 that provides an actual speed signal $E_{as}$ to the governor summing junction 50. However, an additional sensor is required to monitor the compressor discharge pressure $P_{cd}$. To this end, there is shown a pressure-to-voltage transducer 150 functionally depicted as consisting of a chamber 152 pneumatically connected to the output of the compressor 14 of the engine 10 through a conduit 154 and containing bellows 156. The bellows 156 contracts and expands in accordance with increases and decreases respectively of the compressor discharge pressure $P_{cd}$ and drives a wiper 158 of a potentiometer 159 connected between the positive supply voltage and ground. As such, the voltage level $E_{cdp}$ at the wiper 158 is a measure of the absolute pressure developed by the compressor, or $P_{cd}$.

As noted above, it is desirable in certain instances to limit the minimum rate of fuel flow to a gas turbine only as a function of the compressor discharge pressure $P_{cd}$ so that a maximum allowable deceleration rate can be achieved. To this end, the embodiment illustrated in FIG. 1 includes means responsive to the deceleration of the prime mover exceeding a predetermined value to render the minimum fuel rate function generator 102 ineffective and to limit the minimum rate of fuel flow $W_f$ to the prime mover solely as a function of compressor discharge pressure $P_{cd}$. For developing a measure of deceleration there is provided a differentiating circuit 170 having an input 172 for receiving the actual speed signal $E_{as}$ from the speed sensing circuit 30. The differentiating circuit 170 has an output terminal 174 which provides a signal $E_{dec}$ having a magnitude proportional to the actual deceleration of the engine 10. The signal $E_{dec}$ is applied to one input terminal 178 of a threshold detector 180, the other input terminal 182 of which is connected to a wiper of a potentiometer 184 connected between the negative supply voltage and ground. The potentiometer 184 provides an adjustable deceleration reference by producing a negative voltage $E_{dr}$ at the detector reference terminal 182. The magnitude of the signal $E_{dr}$ represents the value which the deceleration signal $E_{dec}$ at the detector terminal 178 may achieve before absolute limiting of the minimum fuel rate becomes desirable. The detector 180 is preferably a differential comparator circuit, the construction of which is well known to those skilled in the art. The output from the detector 180 selectively energizes a coil 186 of a relay so as to selectively control a pair of switching arms 188 and 190.

For the purpose of limiting the minimum value which the fuel flow rate to the engine may achieve, there is provided a constant voltage generator 192 having an output 191 selectively coupled to a multiplier circuit 194 by the switching arm 190 of the threshold detector relay. The signal at the generator output terminal 191 represents a constant minimum value for the ratio $W_f/P_{cd}$. In the multiplier 194 the signal representing the fixed ratio is multiplied by the signal $E_{cdp}$ representing the prevailing compressor discharge pressure $P_{cd}$. Thus at an output terminal 196 from the multiplier 194 there exists a signal having a voltage level proportional to the permissable minimum flow rate $W_f$. In a summing network consisting of resistors 198 and 200 the multiplier output 196 is compared to the signal $E_{cfr}$ the magnitude of which represents the actual commanded value for the fuel rate $W_f$. The summing resistors 198 and 200 have a common junction 202 coupled to the noninverting input of a differential amplifier 204, the inverting input of which is referenced to ground potential. The output of the amplifier 204 is connected to the cathode of a diode 206, the anode of which is connected to the governor input summing junction 50.

In operation, a commanded decrease in speed for the engine results in a falling voltage level for the speed signal $E_{as}$ produced by the speed sensing circuit 30. The signal $E_{as}$ is differentiated in the differentiator circuit 170 so as to provide a negative-going signal $E_{dec}$ representing the actual deceleration of the engine. This signal is compared to the reference signal $E_{dr}$ in the detector 180 to determine whether the deceleration is exceeding a predetermined value defined by the setting of the potentiometer 184. If the deceleration exceeds this established minimum value, the coil 186 is energized to trip the switching arms 188 and 190 to their actuated positions, in which positions the output 128 from the minimum fuel rate function generator 102 is disconnected from the multiplier 130 and rendered ineffective. At the same time, the constant voltage generator output signal at the terminal 191 is connected to the multiplier 194 via the switching arm 190, where it is multiplied by the signal $E_{cdp}$ representing the compressor discharge pressure $P_{cd}$. With the function generator 102 rendered ineffective, the fuel rate to the engine 10, represented by the magnitude of the signal $E_{cfr}$, may fall rapidly to the absolute minimum value defined by the signal at the output 196 of the multiplier 194. If the signal $E_{cfr}$ reaches this minimum value, the output of the differential amplifier 204 goes to the negative supply potential to clamp the summing point 50 at the input of the governor integrator 34 so as to prevent further decrease in the value of the signal $E_{cfr}$ and the actual flow rate to the engine 10.

The deceleration responsive limiting circuit consisting of the elements 190–206 is identical to the limiting circuit consisting of the elements 126–144 in almost all respects save for the provision of a constant voltage generator 192 rather than variable function generator 102. While in certain instances this duplication of circuit elements may be desirable to allow individual tailoring of the parameters of the multiplier 194 and the resistors 198 and 200 independent of the values for the analogous circuit elements 130, 134 and 138 respectively, in other instances the circuit may be simplified by eliminating the elements 194–206 and by connecting the output 191 of the constant voltage generator 192 to the normally open terminal 210 in place of the positive supply voltage normally applied thereto. So modified, the deceleration threshold detector 180, when energized, transfers the input of the multiplier 130 from the programmed fuel rate generator 102 to the constant voltage generator 192.

As noted above, precision control at the fuel rate limits is facilitated by employment of a precision voltage-to-flow rate transducer for maintaining a fuel flow rate to the burners 12 of the engine 10 in proportion to the magnitude of the governor output signal $E_{cfr}$. As an alternative to the transducer 36 shown in FIG. 1, the transducer illustrated in FIG. 3 may be employed and will also provide precise control of the fuel flow rate. The alternate transducer includes a sealed chamber 220 having an entry conduit 222 for receiving fuel from a constant pressure pump 224 supplied from the fuel source. An output conduit 226 delivers fuel from the cavity 220 to the engine burners at a rate determined by the position of a semi-circular flap 228 controlling the size of an orifice 230 at the chamber end of the conduit 226. The flap 228 is fastened to the shaft 232 of a torque motor 234. The shaft 232 is biased to a central position (in which the orifice 230 is closed) by a biasing spring (not shown) internal to the motor 234. The angle of rotation for the shaft 232 and the flap 228 is determined by the input voltage to the torque motor 234 developed by a driver amplifier 236, which, in turn, is driven by a servo amplifier 238. The servo amplifier 238, like the amplifier 90 of FIG. 1, has a noninverting input terminal referenced to ground potential and an inverting input terminal connected to receive the governor input signal $E_{cfr}$ through a summing resistor 240. The output from the amplifier 238 is fed back to its inverting input terminal through an R-C series circuit consisting of a resistor 242 and a capacitor 244. Connected in the manner described, the amplifier 238 provides a form of integral plus proportional control for the forward loop of the transducer.

To complete the transducer control loop, the flow rate is monitored by a sensor 246 in the form of a plunger 248 which positions a core 250 relative to an inductive device 252 against the force of a spring 254. The inductive device 252 provides an a-c. output signal proportional to the flow rate through the conduit 222, which, in turn, is proportional to the flow rate through the orifice 230 to the burners. This a-c. signal is converted into a DC signal of corresponding magnitude in an a-c. to d-c. converter 256 and thereafter applied through a summing resistor 258 to the inverting input of the amplifier 238 to complete the feedback loop for the transducer.

In operation, an increase in the commanded flow rate signal $E_{cfr}$ results in a decreasing voltage at the output of the amplifier 238 and an increasing voltage at the output of the amplifier 236. The shaft 232 of the torque motor 234 begins to turn the flap 228 so as to increase flow through the orifice 230 to the burners of the engine. The increased flow rate out of the chamber 220 is reflected in a corresponding increasing flow rate into the chamber 220 from the pump 224 against the plunger 248. As the plunger 248 compresses the spring 254, the core piece 250 moves upward in the inductive device 250 to increase the magnitude of the signal to the a-c. to d-c. converter 256. The flow rate through th orifice 230 increases until the output signal from the converter 256 exactly balances against the commanded flow rate signal $E_{cfr}$ at the input to the transducer. Any variation in the transducer control loop, which might be due to temperature buildup or drifting in the characteristics of the motor 234 for example, is compensated for by the integral term developed at the output of the operational amplifier 238 as a result of the R-C series feedback.

Figure 3:
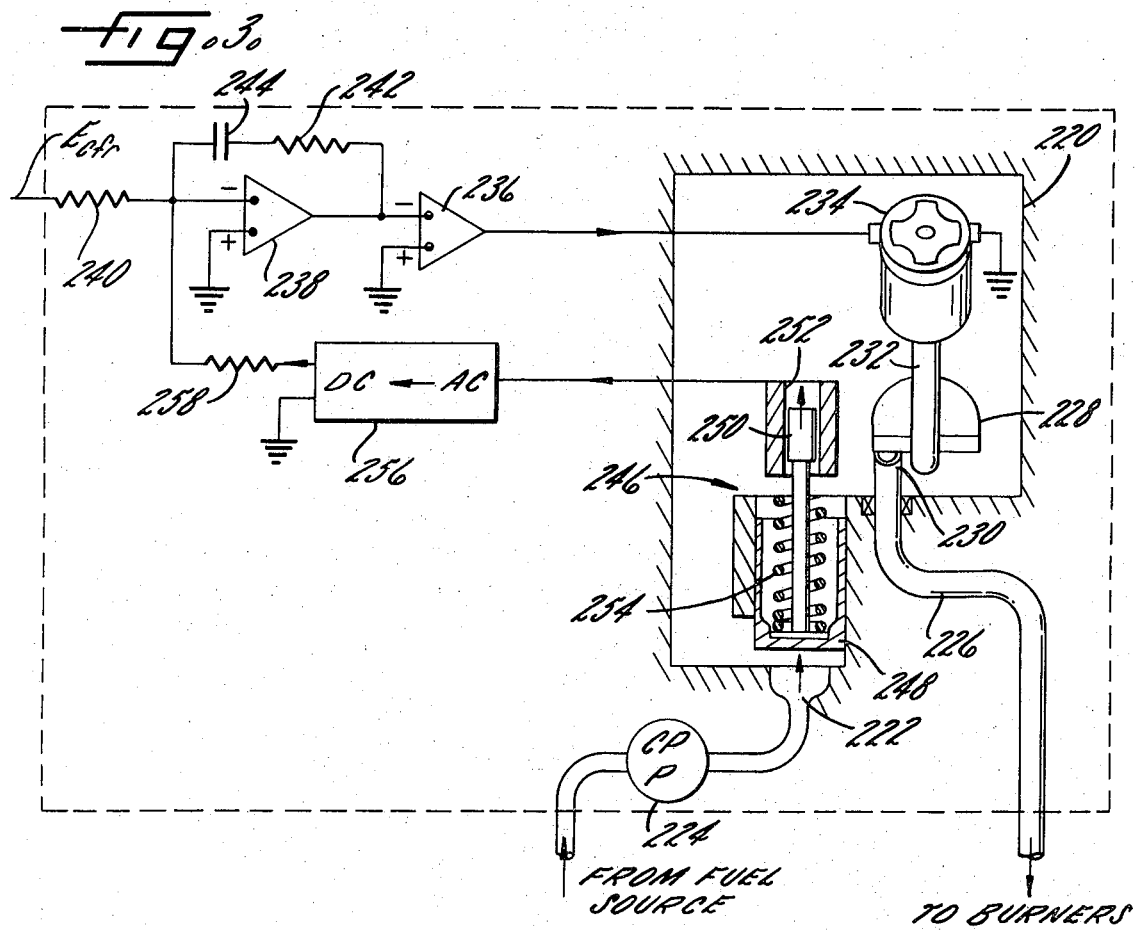
FIG. 3 is a diagrammatic illustration of a second embodiment of the voltage-to-flow rate transducer used in the present invention.

The cumulative result is that the rate of fuel flow to the burners from the fuel source increases and decreases precisely in proportion to increases and decreases in the commanded fuel rate signal $E_{cfr}$. As such, this alternate transducer shown in FIG. 3 is suitable for use with the limiting system previously described in the same manner as is the transducer 36 depicted in the embodiment of FIG. 1.

While the limiting system represented by the illustrated embodiment is sufficient for many fuel rate control applications, other applications may require the sensing of additional parameters, such as the turbine inlet temperature and the compressor inlet pressure, for computing more exactly defined limits for the fuel rate $W_f$ to the engine 10. One skilled in the art will appreciate that the operating characteristics defined in the graph of FIG. 2, in most instances, give optimum results at only one operating temperature. To achieve optimum performance and the optimum definition of maximum and minimum limits, it is desirable to provide maximum and minimum fuel rate function generators which are responsive not only to the actual speed of the engine 10 but also to the operating temperature. Of course, these additional operating variables may be monitored for computing limits in the manner well known to those skilled in the art without departing from the spirit and scope of the present invention. It will also be apparent that the relay 186 and its contacts 188, 190 shown in FIG. 1 may be replaced with suitable solid state switching devices as a matter of choice; and that the signals $E_1$, $E_2$, $E_3$ may be coupled to the summing junction 50 through appropriate small input resistors which provide a desired "weighting" of the supervisory effect of these respective signals on the otherwise effective speed error signal.

I claim:

1. In apparatus for controlling the rate of energy input to a prime mover, the combination comprising
   a. means for producing a first signal representing an adjustable set point speed,
   b. means for producing a second signal representing the actual speed of the prime mover,
   c. means, including an integrator and responsive to said first and second signals, for producing a command signal which normally varies as the time integral of the difference between said first and second signals,
   d. means responsive to said command signal for supplying energy to the prime mover at a rate precisely proportional to that command signal,
   e. means for producing a third signal representing a limit value of the rate of energy supply,
   f. means for producing a clamp signal whenever said command signal is beyond the limit represented by said third signal, and
   g. means for supplying said clamp signal to the input of said means (c) to override said first and second signals and restore said command signal to within the limit value, whereby the actual rate of energy supply to the prime mover is held at or within the limit value.

2. The combination set forth in claim 1 wherein said means (d) includes
   d1. means responsive to an input signal for transferring fuel to said prime mover at a rate generally proportional to that signal,
   d2. means for producing a feedback signal precisely proportional to the actual rate of fuel transfer.
   d3. means for algebraically combining said command signal and said feedback signal to produce an energizing signal which varies as the time integral of the difference therebetween, and
   d4. means for supplying said energizing signal as an input signal to said means (d1).

3. The combination set forth in claim 2 wherein
   i. said means (d1) is a controllable speed motor receiving an input signal and driving a constant displacement pump supplying fuel from a source to the prime mover,
   ii. said means (d2) is a speed-sensing transducer responsive to the speed of said motor and pump, and
   iii. said means (d3) is an integrating operational amplifier having as its opposed polarity inputs said command signal and the feedback signal produced by said transducer, and producing at its output said energizing signal.

4. The combination set forth in claim 1, wherein said means (c) includes
   c1. an integrating amplifier having first and second algebraic summing inputs through which said first and second signals are applied in opposed relation to a summing junction,
   c2. the output of said integrating amplifier thereby being said command signal, and
   c3. said integrating amplifier having said clamp signal applied to its summing junction to restore the command signal to said limit value whenever the clamp signal exists.

5. The combination set forth in claim 1 further including a plurality of said means (e) for producing a plurality of said third signals each representing a different limit value for the rate of energy supply, a plurality of said means (f) for producing a plurality of said clamp signals when said command signal is respectively beyond the limit represented by a corresponding one of said third signals, and means for supplying all of said clamp signals to said means (c), so that the presence of any one clamp signal restores said command signal to the corresponding limit value.

6. The combination set forth in claim 1 further characterized in that said prime mover is a rotary reacton engine having a fuel burner, a compressor discharging air into said burner, and a turbine with blades driven by the discharge from the burner, and in that said means (e) includes
   e1. means responsive to said first control signal for producing said third signal as a predetermined arbitrary function of the engine speed which represents either the maximum safe fuel rate for any speed to avoid burning of the turbine blades or the minimum safe fuel rate for any speed to avoid extinguishment of the burner.

7. In a speed governing system for a prime mover, the combination comprising
   a. means for producing a first signal representing an adjustable set point speed,
   b. means for producing a second signal representing the actual speed of the prime mover,
   c. an algebraic summing, integrating amplifier having first and second inputs leading to a summing junction and respectively receiving said first and second signals in opposed relation, whereby the output of said amplifier is a command signal which normally varies as the time integral of the difference between the first and second signals,
   d. means coupled to receive said command signal for supplying energy to the prime mover at a rate which is precisely proportional to that command signal,
   e. means for producing a third signal representing a limit value of the rate of energy supply,
   f. means for continuously comparing said command signal and said third signal to produce a constant signal of predetermined magnitude only when the command signal is beyond the limit represented by the third signal, and
   g. means coupling the output of said comparing means to said summing junction to clamp the effective input of said ingrating amplifier to the value of said constant signal when the latter exists, and
   h. said constant signal having a polarity to cause the command signal to decrease or increase when the limit value represented by said third signal is an upper or lower limit.

* * * * *